(12) United States Patent
Blinick et al.

(10) Patent No.: US 8,898,653 B2
(45) Date of Patent: Nov. 25, 2014

(54) NON-DISRUPTIVE CODE UPDATE OF A SINGLE PROCESSOR IN A MULTI-PROCESSOR COMPUTING SYSTEM

(75) Inventors: Stephen L. Blinick, Tucson, AZ (US); Chiahong Chen, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 1588 days.

(21) Appl. No.: 11/769,083

(22) Filed: Jun. 27, 2007

(65) Prior Publication Data
US 2009/0006809 A1    Jan. 1, 2009

(51) Int. Cl.
*G06F 9/44* (2006.01)
*G06F 9/445* (2006.01)

(52) U.S. Cl.
CPC .................................. *G06F 8/65* (2013.01)
USPC ........................................................ 717/168

(58) Field of Classification Search
None
See application file for complete search history.

(56) References Cited

U.S. PATENT DOCUMENTS

| | | | |
|---|---|---|---|
| 5,537,598 A | 7/1996 | Kukula et al. | |
| 5,613,133 A | 3/1997 | Bell et al. | |
| 6,044,461 A | 3/2000 | Agha et al. | |
| 6,460,136 B1 * | 10/2002 | Krohmer et al. | 713/2 |
| 6,505,257 B2 * | 1/2003 | Murata et al. | 710/8 |
| 6,681,389 B1 * | 1/2004 | Engel et al. | 717/173 |
| 6,681,390 B2 * | 1/2004 | Fiske | 717/173 |
| 6,854,069 B2 * | 2/2005 | Kampe et al. | 714/4.12 |
| 7,516,206 B2 * | 4/2009 | Henseler et al. | 709/223 |
| 8,015,559 B2 * | 9/2011 | Nakano et al. | 717/173 |
| 8,111,674 B2 * | 2/2012 | Bheda et al. | 370/338 |
| 2001/0007148 A1 * | 7/2001 | Murata et al. | 717/11 |
| 2002/0092010 A1 * | 7/2002 | Fiske | 717/168 |
| 2005/0125650 A1 | 6/2005 | Chen et al. | |
| 2006/0288252 A1 * | 12/2006 | Kim | 714/23 |
| 2006/0294337 A1 | 12/2006 | Hartung et al. | |

\* cited by examiner

*Primary Examiner* — Li B Zhen
*Assistant Examiner* — Evral Bodden
(74) *Attorney, Agent, or Firm* — Griffiths & Seaton PLLC

(57) ABSTRACT

Updating code of a single processor in a multi-processor system includes halting transactions processed by a first processor in the system and processing of transactions by a second processor in the system are maintained. The first processor then receives new code and an operating system running on the first processor is terminated whereby all processes and threads being executed by the first processor are terminated. Execution of a self-reset of the first processor is commenced and interrupts associated with the first processor are disabled. Only those system resources exclusively associated with the first processor are reset, and memory transactions associated with the first processor are disabled. An image of the new code is copied into memory associated with the first processor, registers associated with the first processor are reset and the new code is booted by the first processor.

9 Claims, 3 Drawing Sheets

NON-DISRUPTIVE CODE UPDATE OF A SINGLE PROCESSOR IN A MULTI-PROCESSOR COMPUTING SYSTEM

TECHNICAL FIELD

The present invention relates generally to multi-processor computing systems and, in particular, to updating the code for one processor in the system without affecting operation of other processors in the system.

BACKGROUND ART

Some computing systems, such as storage systems, include a controller board which contains a multi-processor embedded system. For example, one CPU (also referred to herein as a "server processor") may function as a controller or server on an operating system while another CPU (referred to herein as a "host adapter processor" or "HA processor") runs a low level and separate embedded microcode image that provides an interface to communicate with external hosts. Architected designs allow the CPUs to operate independently of each other.

When one CPU, such as the server processor, needs to load new code, it typically undergoes a "hardware reset" in order for it to reboot. Because both CPUs on the board are coupled to the same bridge, such a reset encompasses both processors, even though only one needs to reboot. Therefore, in order to load code for the server processor, both the HA processor and the server processor must be reset, taking down the path from the controller board to the host.

Moreover, many multi-processor embedded systems include two or more such controller boards, each of which contains a multi-processor embedded system. When the code for the server processors is to be updated, the boards perform the process described in the preceding paragraph one at a time to prevent both boards from being off-line simultaneously and taking down all paths to the host. Thus, after the first board completes the new code load, it performs a reset and comes back on-line. The next board then repeats the process. In a dual-board system, the paths through the first and second Host Adapters go down in succession. While there is always at least one path to the host, "ping-ponging" of path removal requires that there be a delay between loading the code on each controller board to give the host time to adjust, thereby increasing the code load time and the host must have its own code sufficiently advanced to handle the paths going down and back up again while the host may be attempting to perform normal operations, such as reading and writing to a storage unit attached to the controller boards.

SUMMARY OF THE INVENTION

The present invention provides a method for updating code of a single processor in a multi-processor system. Transactions processed by a first processor in the system are halted and maintaining processing of transactions by a second processor in the system. The first processor then receives new code and an operating system running on the first processor is terminated whereby all processes and threads being executed by the first processor are terminated. Execution of a self-reset of the first processor is commenced and interrupts associated with the first processor are disabled. Only those system resources exclusively associated with the first processor are reset, and memory transactions associated with the first processor are disabled. An image of the new code is copied into memory associated with the first processor, registers associated with the first processor are reset and the new code is booted by the first processor.

The present invention also provides a computer program product of a computer readable medium usable with a programmable computer and having computer-readable code embodied therein for updating code of a single processor in a multi-processor system. The computer-readable code includes instructions for performing the steps of the method of the present invention.

The present invention further provides a method for deploying computing infrastructure, comprising integrating computer readable code into a multi-processor computing system, wherein the code, in combination with the computing system, is capable of performing the steps of the method of the present invention.

The present invention also provides a computing system having at least a first multi-processor controller. The first multi-processor controller includes a first server processor operable to execute operating system code for the first controller, a first host adapter processor operable to execute code providing an interface with attached hosts, a first bus to which first system resources are coupled, a first memory and a first bridge. The first bridge includes means for providing intercommunication among the first server processor, the first host adapter processor, the first bus and the first memory, a first interrupt control module and a first memory control module. The system further includes first logic associated with the first server processor. The first logic is configured to halt transactions processed by the first server processor without affecting processing of transactions by the first host adapter processor, receive new code, terminate the operating system code whereby all processes and threads being executed by the first server processor are terminated, commence execution of a self-reset of the first server processor, disable interrupts associated with the first server processor, reset only those first system resources exclusively associated with the first server processor, disable memory transactions associated with the first server processor, copy an image of the new code into memory associated with the first server processor, reset registers associated with the first server processor, and boot the new code for the first server processor

DETAILED DESCRIPTION OF THE PREFERRED EMBODIMENT

Figure 1:
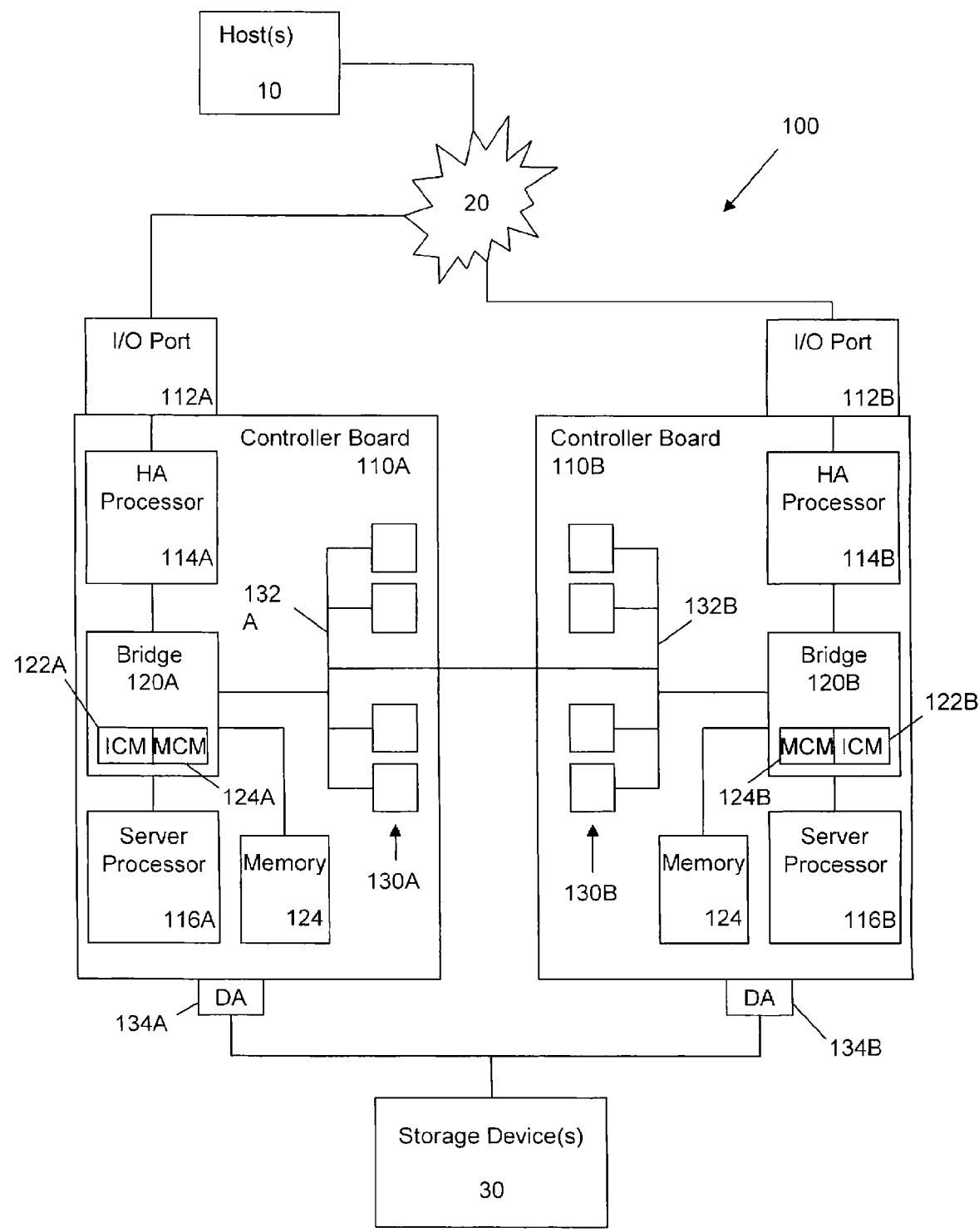
FIG. 1 is a block diagram of a multi-processor computing system in which the present invention may be implemented.

The components described herein with respect to the block diagram of FIG. 1 have been labeled as in a manner so as to more particularly emphasize their function and implementation independence. For example, a component may be implemented as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices or the like.

Some components may also be implemented in software for execution by various types of processors. A component of executable code may, for instance, comprise one or more physical or logical blocks of computer instructions which may, for instance, be organized as an object, procedure, or function. Nevertheless, the executables of an component need not be physically located together, but may comprise disparate instructions stored in different locations which, when joined logically together, comprise the component and achieve the stated function. Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, components or operations are not shown or described in detail to avoid obscuring aspects of the invention.

FIG. 1 is a block diagram of a multi-processor computing system 100 in which the present invention may be implemented. The configuration of the system 100 is illustrated by way of example and not limitation. Although the present invention may be implemented in a system with any number of controller boards, including only one board, for clarity the illustrated system 100 includes two controller boards 110A, 110B. Each controller board 110A, 110B is interconnected with one or more hosts, represented by the host 10, through an I/O port 112A, 112B. The interconnection with the host 10 may be a direct connection or through a network 20. Both controller boards 110A, 110B include multiple processors. Although the present invention may be implemented on boards with any number of processors performing any of a number of functions, for clarity each board 110A, 110B in the illustrated example includes two processors, a host adapter (HA) processor 114A, 114B and a server processor 116A, 116B. The HA processors 114A, 114B are coupled to the respective I/O ports 112A, 112B. The HA processors 114A, 114B and server processors 116A, 116B are interconnected through a bridge 120A, 120B. Each bridge 120A, 120B includes an interrupt control module (ICM) 122A, 122B and a memory control module (MCM) 124A, 124B. Both controller boards 110A, 110B also include a memory device 118A, 118B coupled to the bridge 120A, 120B. Peripheral devices or board resources, collectively identified in FIG. 1 as 130A, 130B are coupled to the bridge 120A, 120B through a bus 132A. 132B. Resources may include, but are not limited to, hard disk drives, memory, network adapters, serial ports, flash chips, flash drives, 12C controller, etc. The bridges 120A, 120B are also interconnected with each other through the respective buses 132A, 132B. If, as in the illustrated example, the controller boards 110A, 110B are storage controller boards, one or more storage devices, represented by the storage device 30, are coupled to the boards 110A, 110B through device adapters 134A, 134B, again either directly or through a network. It will be appreciated that other components may be a part of the system 100 or of the controller boards 110A, 110B but are not shown in FIG. 1 for purposes of clarity and relevance to the present invention.

The flowcharts that are described herein are generally set forth as logical flow diagrams. As such, the depicted order and labeled steps are indicative of one embodiment of the presented process. Other steps and processes may be conceived that are equivalent in function, logic or effect to one or more steps, or portions thereof, of the illustrated process. Additionally, the format and symbols employed are provided to explain the logical steps of the process and are understood not to limit the scope of the process. Although various arrow types may be employed in the flowcharts, they are also understood not to limit the scope of the corresponding process. Indeed, the arrows and connectors are used to indicate only the general logical flow of the process. Additionally, the order in which a particular process occurs may or may not strictly adhere to the order of the corresponding steps shown.

Figure 2:
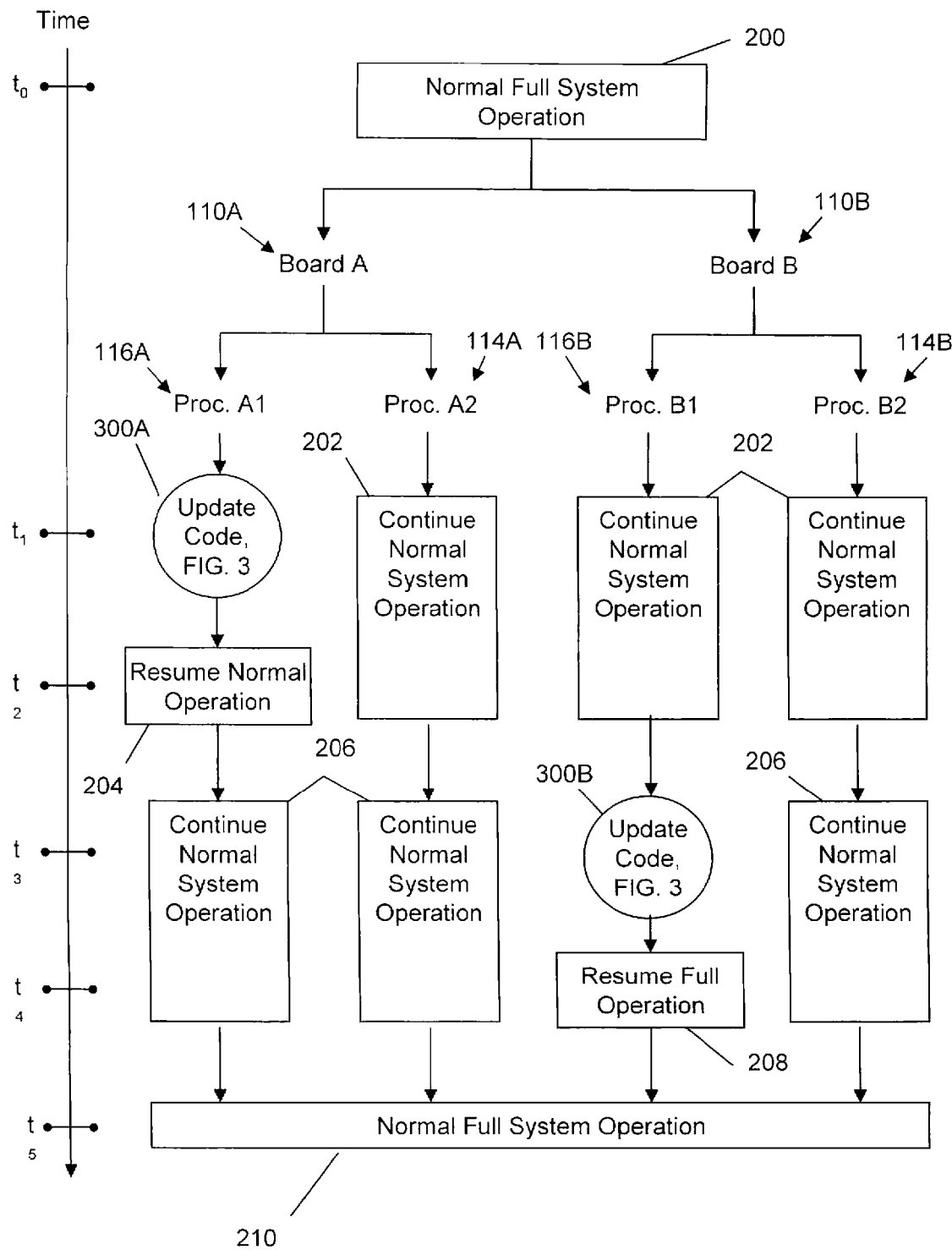
FIG. 2 is a high level functional diagram of a method of the present invention.

FIG. 2 is a high level functional diagram of a method of the present invention, illustrating the flow of operations relative to other operations with relative time being represented by time indicators on the vertical arrow to the left of the diagram. The diagram begins at some time to with the system 100 engaged in normal, full operation (step 200). That is, the two processors 114A, 116A of the first controller board 110A are operating normally and the two processors 114B, 116B of the second controller board 110B are operating normally. Subsequently, at time $t_1$, the code for the server processor 116A of the first controller board 110A is updated (step 300A) as described with respect to the flowchart of FIG. 3. The update is performed without disturbing the normal operation of the HA processor 114A of the first controller board 110A or of either processor 114B, 116B of the second controller board 110B (step 202). Upon completion of the code update to the server processor 116A at time $t_2$, the server processor 116A resumes its normal operation (step 204).

Next, the server processor 116B of the second controller board 110B is updated at time $t_3$ (step 300B), also without affecting the operation of the other processors, including the just-updated server processor 116A (step 206). Upon completion of the code update to the second server processor 116B at time $t_4$, the server processor 116B resumes its normal operation (step 208) and normal, full operation of the system continues at time $t_4$ (step 210).

Figure 3:
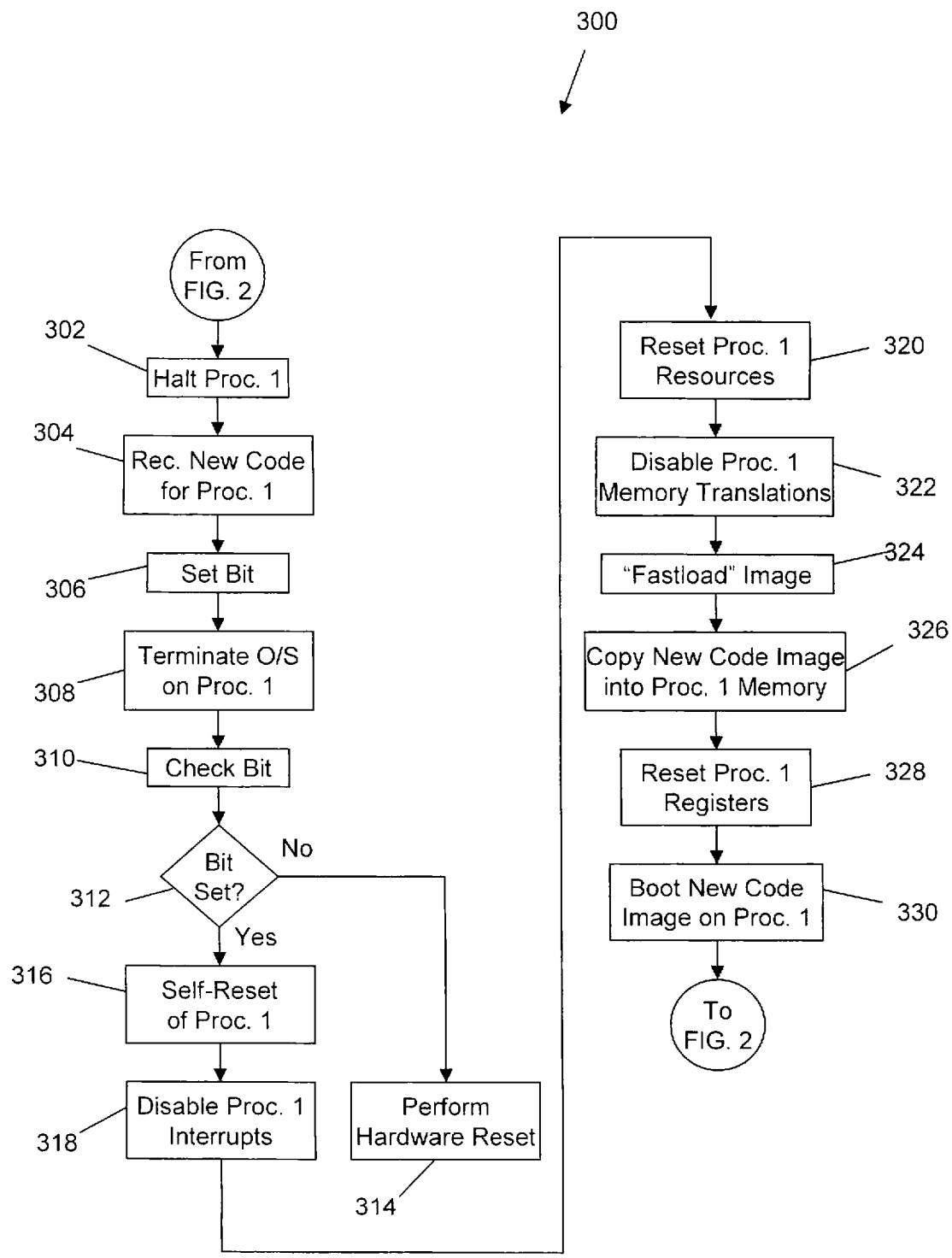
FIG. 3 is a flowchart of a method of updating processor code in accordance with the present invention.

FIG. 3 is a more detailed flowchart of a method 300 (steps 300A, 300B of FIG. 2) of updating processor code in accordance with the present invention. The processor to be updated (referred to in FIG. 3 as "Proc. 1") is halted (step 302) and the new code for Proc. 1 is received (step 304). Proc. 1 unpacks to new code and burns it into flash memory (not shown). Preferably, Proc. 1 sets a specified bit in memory to indicate that it will perform a self-reset (step 308) rather than a conventional hardware reset which would reset all processors, functions, interrupts and resources on the controller board and take down the communication path to the host.

Next, the operating system running on Proc. 1 is terminated (step 306), terminating all threads and processes being executed by Proc. 1. The bit is then checked (step 310). If (step 312) the bit is not set, then a full hardware reset is performed (step 314). If the bit is set, Proc. 1 commences a self-reset (step 316) and disables interrupts over which it has control (step 318). Proc. 1 then resets those resources over which it has exclusive control (step 320), leaving the resources being used exclusively by or being shared with the other processor (Proc. 2). Proc. 1 may become aware of resources which, if reset, would interfere with Proc. 2's use of another resource. If so, the reset process will wait until the resource may be reset without affecting the activities of Proc. 2; that resource may then be reset.

Proc. 1 next disables its memory translations (also known as switching to real mode addressing) to stop the operating system from executing memory access (step 322). Preferably, the process being executed on Proc. 1 jumps to a small piece of code in a well-known location in memory (a "Fastload", as described in commonly-owned co-pending U.S. Patent Publication No. 2005/0125650, incorporated by reference in its entirety) (step 324) and the new code image is copied into the memory 124 (step 326). When the copy of the image has been completed, the registers over which Proc. 1 has control are reset as if they had undergone a hardware reset (step (328), Proc. 1 branches to the new code image and begins booting (step 330). The new operating system begins executing and the new microcode executes in the same fashion as if the boot occurred after a hardware reset.

The code update of the server processor 116A (Proc. 1 in the above description of FIG. 3) on the first controller board 110A is performed without affecting the operation of the HA processor 114A or of the operation of the server processor 116B and HA processor 114B on the second controller board 110B. It will be appreciated that the process is not limited to a system with only two processors on each of two controller boards and the invention is not limited to the illustrated configuration.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for updating code of a single processor in a multi-processor system or a method for deploying computing infrastructure comprising integrating computer readable code into a computing system for updating code of a single processor in a multi-processor system.

What is claimed is:

1. A method for updating code of a single processor in a multi-processor system having resources that are coupled through a bridge to all of the processors in the system, each resource usable exclusively by anyone of the processors and each resource sharable by more than one of the processors, comprising:
    halting transactions processed by a first processor in the system and maintaining processing of transactions by a second processor in the system;
    receiving new code in the first processor;
    terminating an operating system running on the first processor whereby all processes and threads being executed by the first processor are terminated;
    after terminating the operating system, checking the state of a bit settable in memory after receiving the new code in the first processor to determine if a self-reset is to be performed by the first processor;
    performing a hardware reset of the multi-processor system if the bit is not set; and
    if the bit is set:
        commencing execution of a self-reset of the first processor;
        disabling interrupts associated with the first processor;
        resetting only those system resources being exclusively used by the first processor without resetting those system resources being used exclusively by the second processor and without resetting those system resources, including the bridge, being shared with the second processor;
    disabling memory transactions associated with the first processor;
    copying an image of the new code into memory associated with the first processor, after the steps of commencing execution of the self-reset, disabling interrupts, resetting, and disabling the memory transactions;
    resetting registers over which the first processor has control as if a hardware reset had occurred; and
    executing the new code by the first processor as if a hardware reset had occurred.

2. The method of claim 1, wherein the new code comprises new operating system code.

3. The method of claim 1, further comprising performing a fastload by the first processor after resetting the exclusive system resources.

4. A computing system having at least a first multi-processor controller, the first multi-processor controller comprising:
    a first server processor operable to execute operating system code for the first controller;
    a first host adapter processor operable to execute code providing an interface with attached hosts;
    a first bus to which first system resources are coupled;
    a plurality of resources, each resource usable exclusively by either of the processors and each resource sharable by both of the processors, the resources including: a first memory;
        a first bridge coupled to the first server processor, the first host adapter processor, the first bus and the first memory, the first bridge comprising:
            a first interrupt control module; and
            a first memory control module; and
    first logic associated with the first server processor configured to:
        halt transactions processed by the first server processor without affecting processing of transactions by the first host adapter processor;
        receive new code;
        terminate the operating system code whereby all processes and threads being executed by the first server processor are terminated;
        after terminating the operating system, check the state of a first bit settable in memory after receiving the new code in the first server processor to determine if a self-reset is to be performed by the first server processor;
        perform a hardware reset of the multi-processor system if the first bit is not set; and
        if the first bit is set:
            commence execution of a self-reset of the first server processor;
            disable interrupts associated with the first server processor;
            reset only those first system resources being exclusively used by the first server processor without resetting those system resources being used exclusively by the first host adapter processor and without resetting those system resources, including the bridge, being shared with the first host adapter processor;
            disable memory transactions associated with the first server processor;
            copy an image of the new code into memory associated with the first server processor, after commencing execution of the self-reset, disabling interrupts, resetting, and disabling the memory transactions;
reset registers over which the first server processor has control as if a hardware reset had occurred; and
boot the new code for the first server processor as if a hardware reset had occurred.

5. The computing system of claim 4, the logic further configured to direct a fastload by the first server processor after resetting the exclusive system resources.

6. The computing system of claim 4, further comprising a second multiprocessor controller, the second multi-processor controller comprising:
   a second server processor operable to execute the operating system code for the second controller;
   a second host adapter processor operable to execute the code providing an interface with the attached hosts;
   a second bus to which second system resources are coupled and to which the first bus is coupled;
   a plurality of resources, each resource usable exclusively by either of the processors and each resource sharable by both of the processors, the resources including:
      a second memory; and
      a second bridge coupled to the second server processor, the second host adapter processor, the second bus and the second memory, the second bridge comprising:
         a second interrupt control module; and
         a second memory control module; and
   second logic associated with the second server processor configured to, after the first server processor has completed booting the new code:
      halt transactions processed by the second server processor without affecting processing of transactions by the second host adapter processor;
      receive the new code;
      terminate the operating system code whereby all processes and threads being executed by the second server processor are terminated;
      after terminating the operating system, check the state of the second bit to determine if a self-reset is to be performed by the second processor;
      perform a hardware reset of the multi-processor system if the second bit is not set; and
      if the second bit is set:
         commence execution of a self-reset of the second server processor;
         disable interrupts associated with the second server processor;
         reset only those second system resources being exclusively used by the second server processor without resetting those system resources being used exclusively by the first host adapter processor and without resetting those system resources, including the bridge, being shared with the first host adapter processor;
         disable memory transactions associated with the second server processor;
         copy an image of the new code into memory associated with the second server processor, after the steps of commencing execution of the self-reset, disabling interrupts, resetting, and disabling the memory transactions;
         reset registers associated with the second server processor; and
         boot the new code for the second server processor.

7. A computer program product stored in a non-transitory computer readable medium usable with a programmable computer, the computer program product having computer-readable code embodied therein for updating code of a single processor in a multiprocessor system having resources that are coupled through a bridge to all of the processors in the system, each resource usable exclusively by anyone of the processors and each resource sharable by more than one of the processors, the computer-readable code comprising instructions for:
   halting transactions processed by a first processor in the system and maintaining processing of transactions by a second processor in the system;
   receiving new code in the first processor;
   terminating an operating system running on the first processor whereby all processes and threads being executed by the first processor are terminated;
   after terminating the operating system, checking the state of a bit settable in memory after receiving the new code in the first processor to determine if a self-reset is to be performed by the first processor;
   performing a hardware reset of the multi-processor system if the bit is not set; and
   if the bit is set:
      commencing execution of a self-reset of the first processor;
      disabling interrupts associated with the first processor;
      resetting only those system resources being exclusively used by the first processor without resetting those system resources being used exclusively by the second processor and without resetting those system resources, including the bridge, being shared with the second processor;
      disabling memory transactions associated with the first processor;
      copying an image of the new code into memory associated with the first processor, after the commencing execution of the self-reset, disabling interrupts, resetting, and disabling the memory transactions;
      resetting registers over which the first processor has control as if a hardware reset had occurred; and
      executing the new code by the first processor as if a hardware reset had occurred.

8. The computer program product of claim 7, wherein the new code comprises new operating system code.

9. The computer program product of claim 7, the computer-readable code further comprising instructions for performing a fastload by the first processor after resetting the exclusive system resources.

* * * * *